Sept. 24, 1963   W. A. PENNINGTON ETAL   3,104,522
AIR INTAKES FOR AIR ASPIRATING AIRCRAFT ENGINES
Filed March 24, 1959   3 Sheets-Sheet 1

Inventors:
Wilfrid Alan Pennington
Ronald Charles Harris
Geoffrey Francis Sharples
By: Stevens, Davis, Miller & Mosher, Attorneys

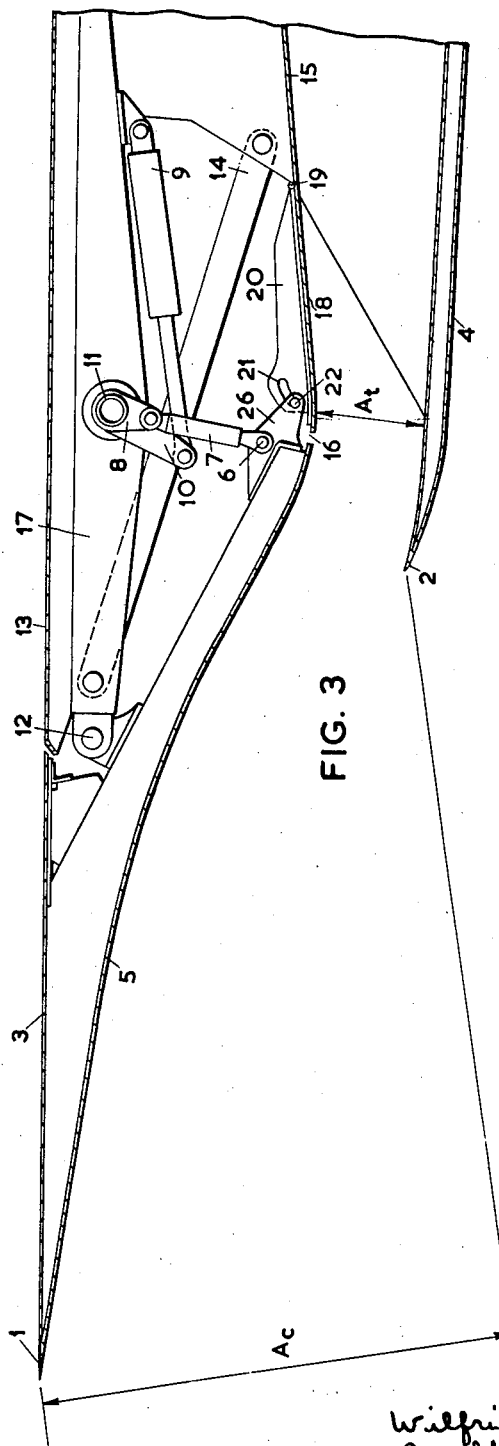

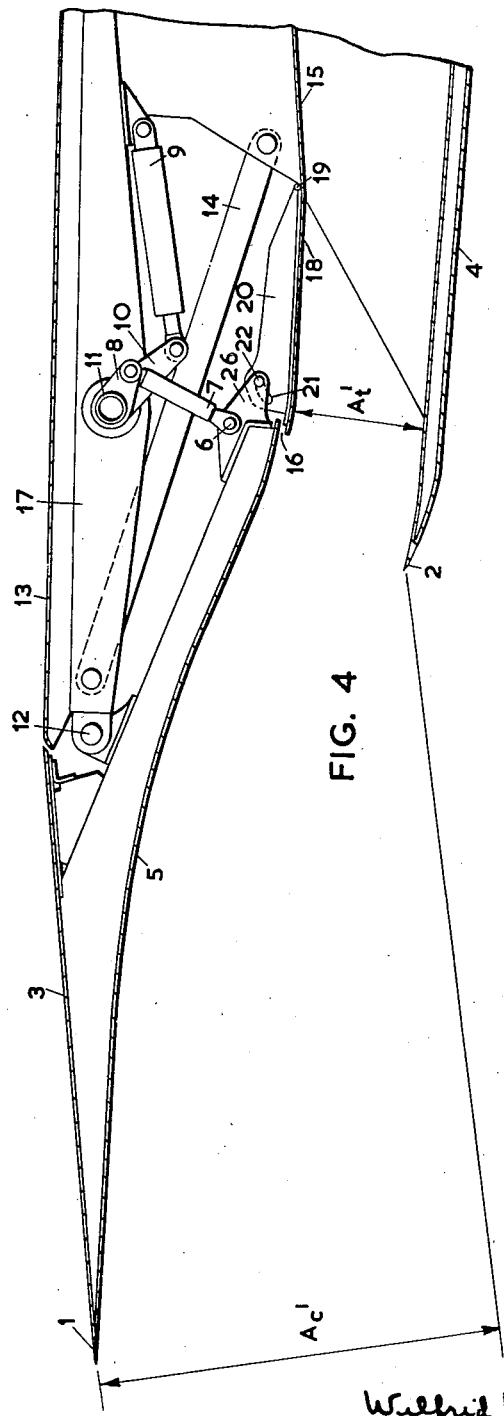

United States Patent Office 3,104,522
Patented Sept. 24, 1963

3,104,522
AIR INTAKES FOR AIR ASPIRATING
AIRCRAFT ENGINES
Wilfrid Alan Pennington, Lytham, Ronald Charles Harris, Preston, and Geoffrey Francis Sharples, Blackpool, England, assignors to The English Electric Company Limited, London, England, a British company
Filed Mar. 24, 1959, Ser. No. 801,651
Claims priority, application Great Britain Apr. 3, 1958
3 Claims. (Cl. 60—35.6)

Air intakes for air aspirating engines of aircraft capable of supersonic flight have been designed with a protruding leading edge followed by an isentropic curve leading to a throat formed between a hump and an opposite lip.

At supersonic flight conditions the air scooped up is compressed by shock waves emanating from the isentropic surface, and is fed into the said throat with comparatively low drag losses.

However at subsonic flight conditions after take off, when maximum acceleration is needed for attaining supersonic flight, and when no compression through shock waves occurs, the stream lines of the scooped up air are substantially parallel to the contour of the isentropic curve, which results in heavy drag losses and possibly an insufficient flow of air into the intake.

For turbo-jet engines this latter difficulty does not arise and even a reduction in throat area may be desirable. On the other hand for ram-jet engines an increase of throat area at high subsonic speeds is necessary. A combination of turbo-jet engines and ram-jet engines may accordingly be balanced so as to require a constant throat area.

According to the present invention the leading edge portion of the air intake i.e. the portion between the protruding leading edge and the throat is articulated in such a manner that at subsonic speeds it can be tilted towards the opposite fixed intake portion in such a manner as to make the forward facing area of the intake equal to the throat area, and thereby substantially to reduce drag losses at the air intake. Drag losses on the outer face of the leading edge portion are possibly increased by tilting this portion, but this increase if any is much smaller than the reduction of drag losses in the intake.

By choosing the hinge point of the leading edge portion it can be attained that the width of the throat may remain constant or may be reduced or increased, as the case may be, when the leading edge portion is tilted. It may be desirable to keep a smooth contour at the throat throughout the tilting movements, or alternatively to leave a gap through which boundary layer flow along the isentropic curve may be sucked off. For this purpose the fixed portion should stand proud of the movable one at this gap.

In order that the invention may be clearly understood and readily carried into effect, an embodiment thereof will now be described by way of example with reference to the accompanying drawings in which:

FIG. 1 diagrammatically illustrates the aero-dynamic conditions at the air intake of an aircraft wing with built-in ram-jet engines (not shown) at design Mach number flight conditions.

FIG. 2 diagrammatically illustrates the aero-dynamic conditions of the same air intake for flight conditions below the design Mach number.

FIG. 3 is a longitudinal section of an air intake according to the invention for a ram-jet engine built into an aircraft wing, adjusted for supersonic flight.

FIG. 4 is a section corresponding to FIG. 3 with the leading edge portion deflected for subsonic flight.

Figure 1:
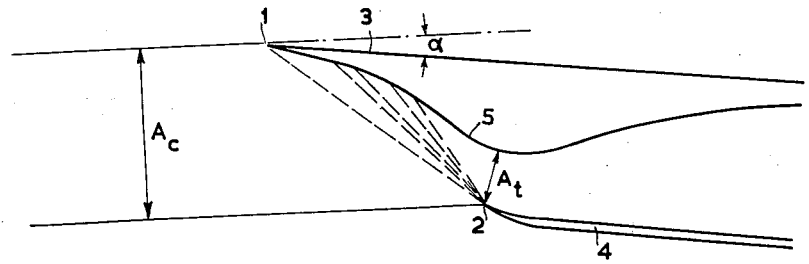

In FIG. 1 the leading edge 1 of an upper wing panel 3 protrudes beyond the lip 2 of a lower wing panel 4. The said leading edge 1 is joined by the isentropic curve 5 of an inner wing panel, including a throat area $A_t$ between its hump and the said lip 2. The free stream area ahead of the air intake is denoted by $A_c$.

At the design condition of supersonic flight (angle of incidence $\alpha$) the air from the free stream area $A_c$ is compressed by shock waves (indicated in dotted lines) emanating from the leading edge 1 and isentropic curve 5, and impinging on the lip 2, whereby the air is compressed isentropically and enters the throat area $A_t$ practically without pre-entry drag.

Figure 2:
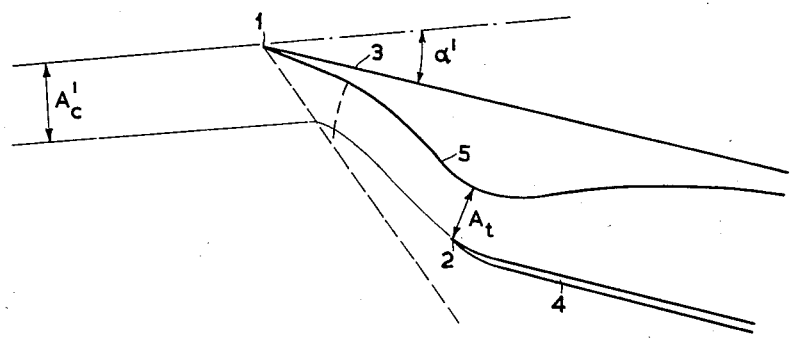

If a fixed intake of this type is operated below the design Mach number the conditions of FIG. 2 prevail: the angle of incidence $\alpha'$ is considerably larger; the throat area $A_t$ is fixed, i.e. the same as in FIG. 1. The amount of compression experienced decreases with decreasing Mach number, and the stream lines entering the intake are substantially parallel to the contour of the isentropic curve 5. Hence the free stream area is reduced to the considerably smaller value $A_c'$. This configuration of the stream lines results in an increasingly large pre-entry drag, and insufficient air may enter the intake.

Referring now to FIG. 3, the air intake illustrated comprises a fixed lower outer panel 4 having a lip 2 and a fixed upper outer panel 13 having an outer face and inner panel 15 rigidly connected to the latter. To a beam 17 forming a fixed structure with the panels 13, 15 and braces 14, a leading edge portion or "beak" is hinged at a pivot 12. This "beak" is composed of an outer panel 3 and an isentropic curve panel 5 joining it at the protruding leading edge 1 and defining a throat between itself and the lip 2 the area of which is denoted $A_t$.

A torque tube 11 is journalled in the structure of the beam 17 and braces 14, parallel to the hinge axis 12, and carries a crank 10, between which and a fixed articulation point on the said structure a control means, e.g. an actuator or jack 9 is articulated. The torque tube 11 has another crank 8, a short connecting rod 7 being articulated between said crank 8 and a pivot point 6 on a bracket 26 fixed near the inner end of the isentropic curve panel 5.

The adjacent part 18 of the inner panel 15 is hinged at 19 and carries a bracket 20 with a slot 21 engaged by follower means such as a pin 22 on the bracket 26. A gap 16 is left between the adjacent edges of the isentropic curve panel 5 and the said hinged part 18 of the inner panel 15. This gap 16 can be used for sucking off the boundary flow from the isentropic curve panel 5 for example by the depression prevailing on the outer face of the upper outer panel and acting through the gap between the panels 3 and 13 on the otherwise sealed interior of the beak and adjacent portion of the fixed structure between the panels 13 and 18, 15.

By contracting the actuator or jack 9, the torque tube 11 is turned anti-clockwise, and the leading edge portion is also drooped anti-clockwise about its pivot axis 12 from the position shown in FIG. 3 into that of FIG. 4.

In this way the air entering the intake is not deflected to any great extent, i.e. the stream lines are less curved, and hence the pre-entry drag is considerably reduced. It should be noted that the permissible deflection of the leading edge 1 is dependent on the incidence of the wing relative to the airstream, i.e. the "beak" must not be deflected beyond the point where the start of the curved panel 5 of FIG. 1 is parallel to the airstream.

As in the embodiment illustrated the pivot axis 12 is ahead of the throat, the latter is enlarged, the enlarged area being denoted $A_t'$. The hinged part 18 follows the movement of the "beak" by swinging about hinge 19 in the clockwise sense. It will be noted from FIG. 4 that the gap 16 formed between the rear edge of the isentropic curve panel 5 and the forward edge of the hinged portion 18 of the inner panel 15, is then enlarged, the edge of portion 18 standing proud of the rear edge of panel 5.

In the position of FIG. 4 the area $A_c$ is reduced to $A_c'$ by the drooping of the leading edge 1, and at the same time the throat area $A_t$ is enlarged to $A_t'$. Accordingly the airflow can enter the throat with greatly reduced drag losses and the throat is capable of passing an increased flow to the propulsion plant to match the requirements thereof at this flight condition.

Some profile drag on the outer panel 3 of the leading edge portion is involved by the drooping thereof, but this is substantially smaller than the reduction in drag losses described hereinabove.

Figure 5:
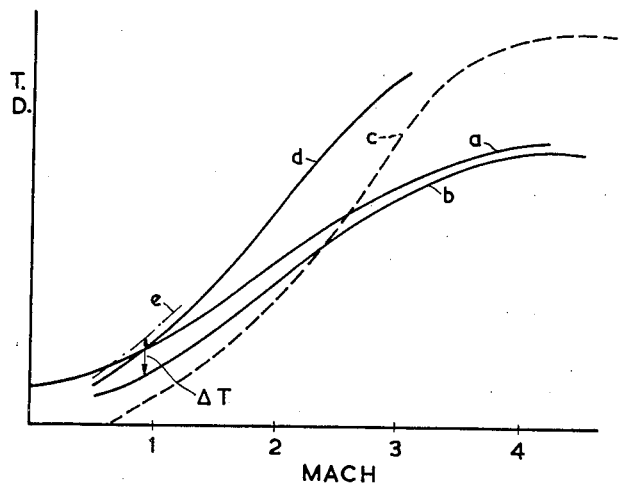
FIG. 5 is a graph plotting thrust and drag forces against Mach numbers.

Referring now to FIG. 5 thrust forces and drags are plotted as ordinates against Mach numbers as abscissae. Graph $a$ shows the drag of a fixed air intake, graph $b$ the reduced drag of a drooping intake according to the invention. Graph $c$ shows the thrust of a ram-jet propulsion system alone, graph $d$ the thrust of a combined ram jet and turbo jet propulsion unit with fixed throat area. Graph $e$ indicates the gain in thrust forces attainable by increase of the throat area.

It will be clear from FIG. 3 that by lowering the drag losses from graph $a$ to graph $b$, and increasing the thrust from graph $d$ to graph $e$ in the transonic range, sufficient excess of thrust over-drag of the combined propulsion unit is attained which is important for the acceleration of the aircraft from subsonic flight to high Mach numbers, at which the thrust of the ram jet engines becomes preponderant.

The embodiment described may be modified in many ways; by placing the hinge axis 12 at the station of the throat or even behind, the throat area $A_t$ may be kept constant or even reduced, when the leading edge portion is dropped.

The whole arrangement may be inversed, i.e. a protruding lower leading edge may be raised. The arrangement may extend over the whole span of the leading edge of a ducted wing using a number of jacks and cranks connected to the torque tube in parallel.

The invention makes it possible to achieve by a single mechanical movement at the same time; the drooping of the leading edge, an increase of the throat area and a variable gap for boundary layer suction whereby aerodynamic intake drag losses can be reduced to an extent not possible heretofore.

What we claim as our invention and desire to secure by Letters Patent is:

1. An air intake including a first boundary forming means and a second boundary forming means forming opposite sides of an intake passage extending through a throat to a diffuser, the first boundary forming means including, upstream of the throat, a wedge shaped member having a leading edge and on one side an outside flat surface exposed to the airstream outside the passage and on the other side a flank which faces towards the passage and extends to the throat, and the second boundary forming means including a lip which extends from its upstream end to the throat, and means mounting the wedge shaped member for tilting relative to the remainder of the intake to increase the size of the throat.

2. In and for an aircraft having an air aspirating engine and capable of supersonic flight, an air intake to said engine, comprising in combination: a fixed lip, a beak member having a forward portion protruding forward beyond said lip, and a rearward portion terminating adjacent an intake throat, said beak member being tiltably mounted relative to said lip about a transverse pivot axis positioned forward of said throat and rearward of the forwardmost portion of said beak member, a movable panel forming said throat with said lip extending aft from said throat, and being hinged at its rear about a transverse axis, actuating means operatively connected to said beak member and to said movable panel for turning the same in opposite senses of rotation, whereby operation of said actuating means tilts the forward portion of said beak member towards and its rearward portion away from said lip and at the same time turning said movable panel away from said lip so as to increase the width of said throat.

3. In and for an aircraft having an air aspirating engine and capable of supersonic flight, an air intake to said engine, comprising in combination: a fixed lip, a beak member having a forward portion protruding forward beyond said lip and a rearward portion terminating adjacent an intake throat, said beak member being tiltably mounted relative to said lip about a transverse pivot axis positioned forward of said throat and rearward of the forwardmost portion of said beak member, a movable inner panel forming said throat with said lip extending aft from said throat, and being hinged at its rear about a transverse axis, actuating means operatively connected to said beak member and to said movable panel for turning the same in opposite senses of rotation, whereby operation of said actuating means tilts the forward portion of said beak member towards and its rearward portion away from said lip and at the same time turning said movable panel away from said lip so as to increase the width of said throat, cam means arranged on said movable inner panel outside said throat, and follower means arranged in the interior of said beak member operatively engaging said cam means in the sense of widening the spacing between the rear edge of said rearward portion of said beak member and the leading edge of said movable inner panel, when said panels are moved in the sense of increasing the width of said throat.

References Cited in the file of this patent

UNITED STATES PATENTS

| | | |
|---|---|---|
| 2,755,039 | Davie | July 17, 1956 |
| 2,836,379 | Salmon | May 27, 1958 |
| 2,840,322 | Griffith | June 24, 1958 |
| 2,877,965 | Wakefield | Mar. 17, 1959 |
| 2,885,162 | Griswold | May 5, 1959 |
| 2,896,408 | O'Donnell | July 28, 1959 |
| 2,916,230 | Nial | Dec. 8, 1959 |

OTHER REFERENCES

Flight, "Engine Intake Controls," by Stack, vol. 77; No. 2553, Dec. 27, 1957, pp. 1000–1002, at p. 1001.